Feb. 28, 1939.   N. M. FREEMAN ET AL   2,148,858
TILE
Original Filed April 24, 1934   3 Sheets-Sheet 1
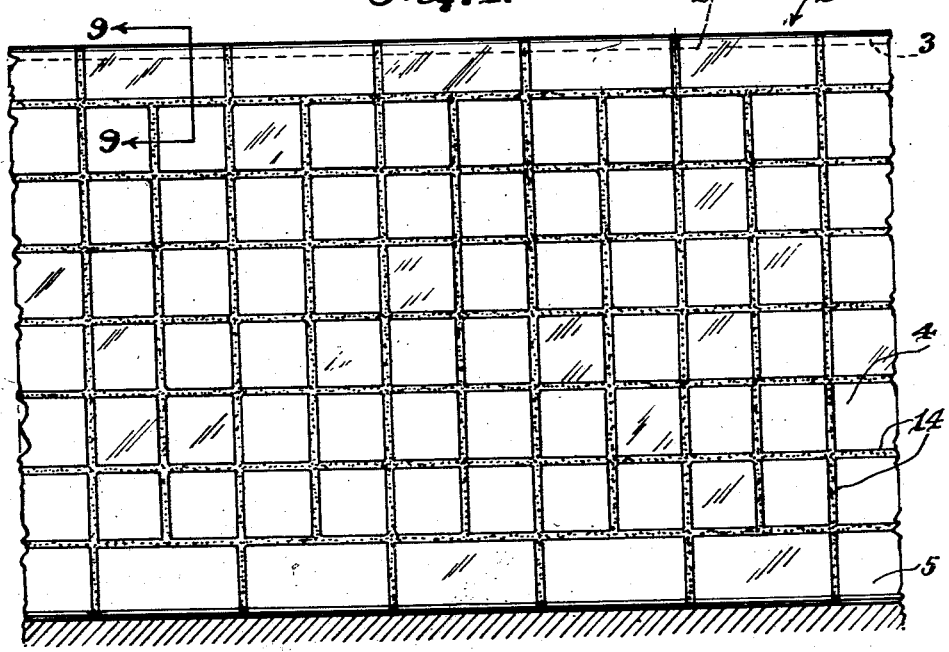
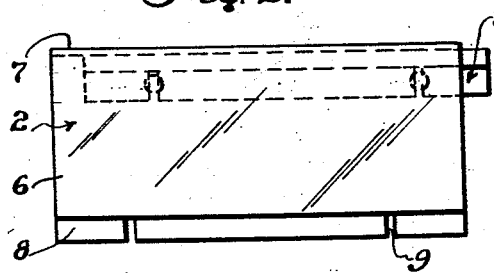
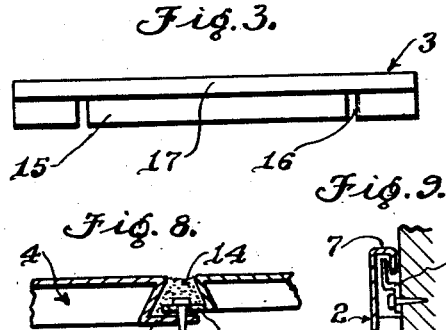
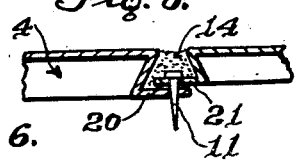
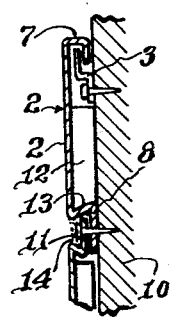
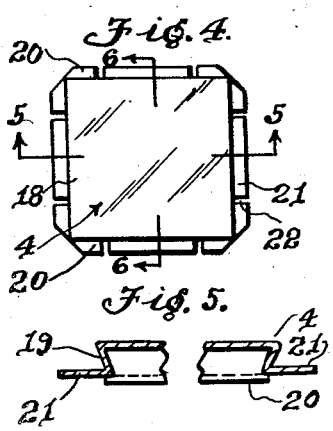
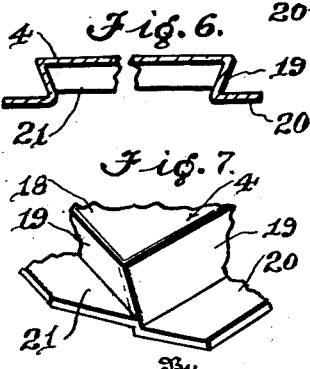
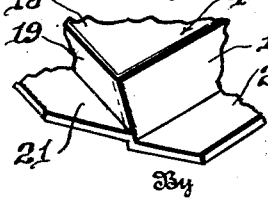
Inventors
Nathan M. Freeman
Clarence H. Korb
By J. Kaplan
Attorney Feb. 28, 1939. N. M. FREEMAN ET AL 2,148,858
TILE
Original Filed April 24, 1934 3 Sheets-Sheet 2
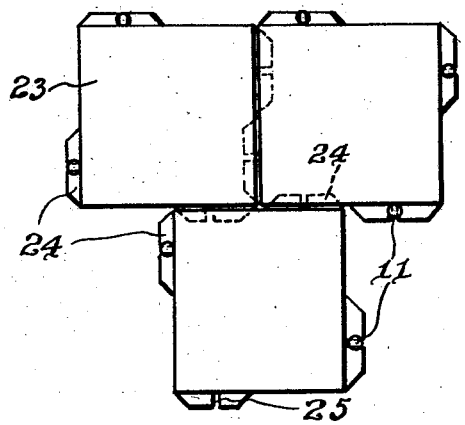
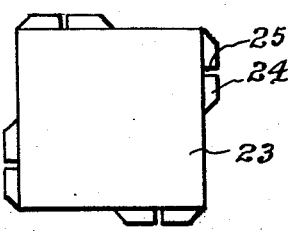
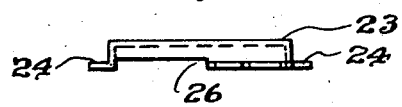
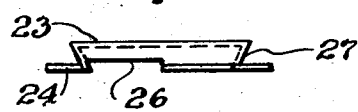
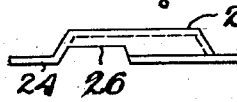
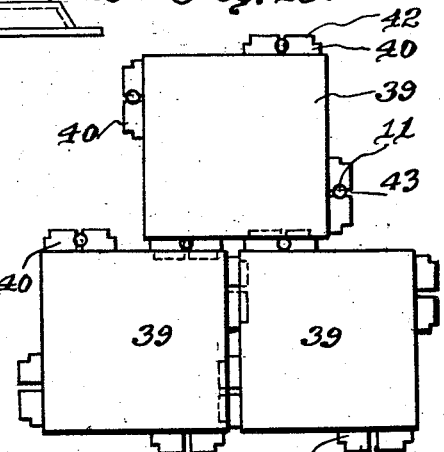
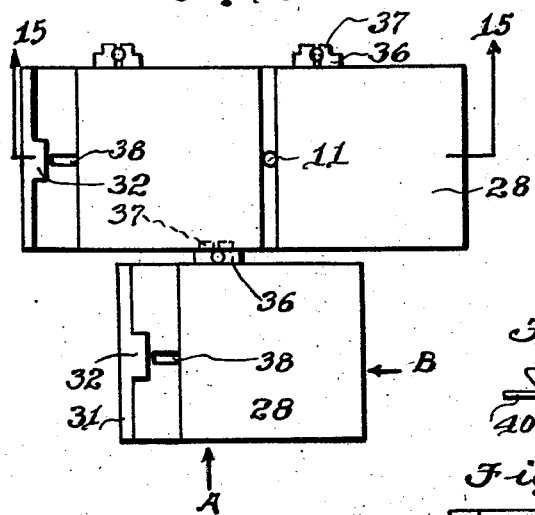
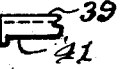
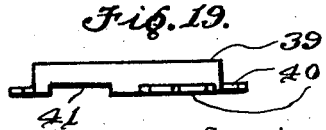
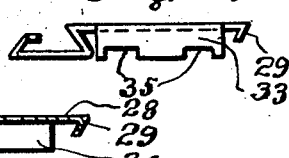
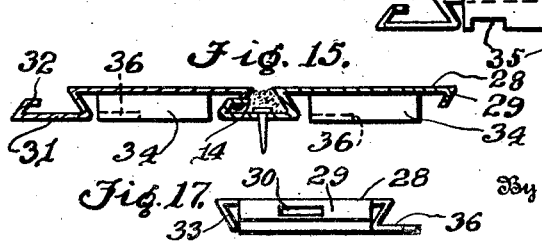
Inventors
Nathan M. Freeman
Clarence H. Korb
By J. Kaplan
Attorney

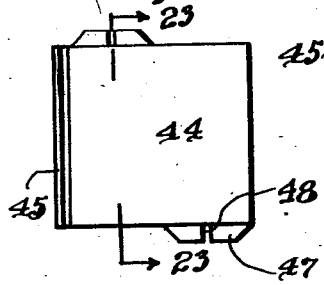
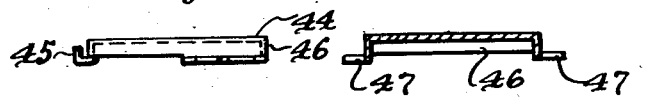
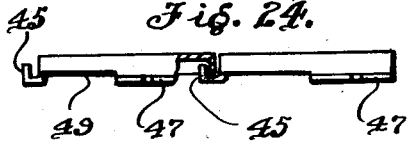
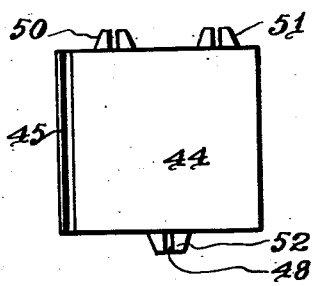
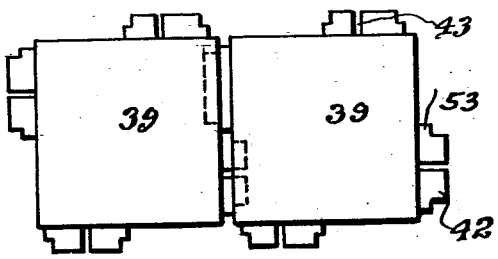
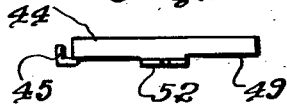
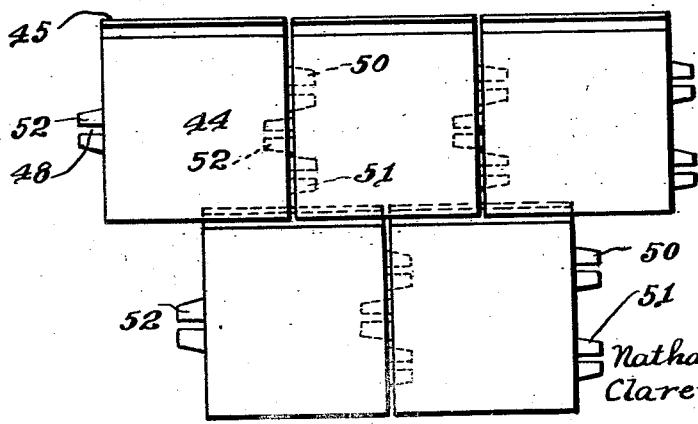

Patented Feb. 28, 1939

2,148,858

UNITED STATES PATENT OFFICE 2,148,858

TILE

Nathan M. Freeman, Brooklyn, and Clarence H. Korb, Freeport, N. Y.

Refiled for abandoned application Serial No. 722,181, April 24, 1934. This application October 19, 1937, Serial No. 169,854

9 Claims. (Cl. 189—85)

This application is a refiled application, the original application being Serial No. 722,181, filed April 24, 1934, and allowed January 14, 1936.

This invention relates to sanitary wall coverings of metal tile construction.

The main object of the invention is to provide an improved wall covering of simple and inexpensive construction wherein a plurality of separable tiles may be easily and quickly assembled on a wall in interlocking relation so as to simulate the ordinary tile formation such as is commonly used in bath rooms and the like.

Another object of the invention is to provide the tiles with flanges so that when the tiles are in place the flanges of each tile will overlap or underlap with those surrounding it in order that every tile will help to keep in place the surrounding tiles.

Another object of the invention is to improve the appearance of the tile structure by dividing the tile surface into sections or units as with ordinary ceramic tile and providing means between the adjacent tiles to hold a cement filler.

Still another object of the invention is to arrange the flanges so that the tile can be arranged in line with each other or in a staggered relation to each other.

A still further object of the invention is to provide means to interlock the tiles with each other so as to provide for a wide or narrow grout between the adjacent tiles.

Other objects of the invention will appear as the disclosure progresses. The drawings are intended to illustrate a possible embodiment of the invention. It is obvious that the actual needs of manufacture may necessitate certain mechanical changes. It is therefore not intended to limit the invention to the embodiment illustrated but rather to define such limits in the appended claims. For a general understanding of the invention attention is called to the drawings. In these drawings like reference characters denote like parts throughout the specification.

In the drawings:

Fig. 1 is a front view of the assembled tile shown attached to a wall;

Fig. 2 is a detached view of one of the upper rows of tile;

Fig. 3 is a view of the support for the upper row of tile;

Fig. 4 is a detached view of the tile used in the body of the wall and adapted for a wide grout as shown in Fig. 1;

Fig. 5 is a section on line 5—5 of Fig. 4;

Fig. 6 is a section on line 6—6 of Fig. 4;

Fig. 7 is a fragmentary enlarged perspective view of the tile shown in Fig. 4;

Fig. 8 is a detail showing two tiles fastened together;

Fig. 9 is an enlarged section on line 9—9 of Fig. 1;

Fig. 10 is a view of a group of tiles assembled together spaced for a hair line grout;

Fig. 11 is a detached view of one of the tiles shown in Fig. 10;

Fig. 12 is an edge view of the tile shown in Fig. 10 having inwardly sloping sides;

Fig. 12a is an edge view of the tile shown in Fig. 10, wherein said tile has outwardly sloping sides;

Fig. 13 is an edge view of the tiles shown in Fig. 10 but having straight sides;

Fig. 14 is a modified form of a group of tiles assembled together and spaced for a wide grout;

Fig. 15 is a section on line 15—15 of Fig. 14;

Fig. 16 is an edge view of one of the tiles shown in Fig. 14 looking in the direction of arrow A;

Fig. 17 is an edge view of one of the tiles shown in Fig. 14 looking in the direction of arrow B;

Fig. 18 is another modified form of a group of tiles assembled together and spaced for a wide grout;

Fig. 19 is an edge view of the tile shown in Fig. 18 and having straight sides;

Fig. 20 is a fragmentary view of a modified form of the tile shown in Fig. 18 having four sloping sides;

Fig. 21 is a view of another modified form of the tile;

Fig. 22 is an edge view thereof;

Fig. 23 is a cross section taken on line 23—23 of Fig. 21;

Fig. 24 is an edge view showing how the tiles interlock with each other;

Fig. 25 is a view of another modification of the tile;

Fig. 26 is an edge view thereof;

Fig. 27 shows a series of the tiles shown in Fig. 25 interlocked together;

Fig. 28 is another edge view of the tile;

Fig. 29 is another modified form of a group of tile interlocked together; and

Fig. 30 is an edge view thereof.

Referring now to the drawings in detail, numeral 1 designates the tiled wall consisting of an upper row of tile 2, held in place at the top by the support 3, a main section of tile 4 and a base or bottom row 5. The tile used in the upper row comprises a front face 6, an inturned upper edge 7 and a bottom flange 8. Nailing slots 9 are provided in the bottom flange for fastening the structure to the wall or backing 10 by the nails 11, as shown in Fig. 9. The sides 12 and 13 can be bent inwardly so as to form a wedge shaped recess with the adjoining tile to securely hold the grout. In this recess is poured the cement or grout 14 which gives the finishing touch to the tile structure. The cement or grout also forms a very secure seat for the tile, thus preventing any yielding or movement of the tile under pressure which would tend to loosen the grout and give an impression of lack of solidity of the wall. The support 3 comprises a flat face 15 provided with nail slots 16 and adapted to bear against the wall as indicated in Fig. 9, and an upper flange 17 which fits underneath the inturned upper edge 7 of the tile 2.

The tile 4 shown in Fig. 4 is used for the main section of the wall and comprises an outer face 18, four inwardly sloping sides 19 and outwardly extending flanges 20 and 21 provided with nail slots 22. The flanges 21, as best seen in Fig. 7, are raised above the flanges 20 so that the flange of the adjacent tile can be tucked underneath. Otherwise, if all the flanges were on the same level the tiles would twist and be under strain when nailed to the wall and cause raised portions to be formed at each meeting place of four tiles and which would make the finished wall unsightly. One of the flanges is tucked underneath. Another flange is clearly seen in Fig. 8.

The tiles so far described are adapted for wide grouting. Now when it is desired to have a hair line grout, the tile shown in Fig. 10 is used for this purpose. The tiles in this figure are shown in a staggered relation to each other. However, with a slight rearrangement of the flanges the tiles can be applied to the wall so that the grout will be in a straight line, as shown in Fig. 1. Numeral 23 designates the body or exposed face of the tile, and 24 a series of flanges adjacent the corners of the tile and provided with nail slots 25. The side portions of the tile which have no flanges are undercut as at 26 in order to clear the flanges of the adjacent tile. As noted by the dotted lines, the flange of one tile slips underneath the body of the adjoining tile. The tile can have all of its sides 27 sloping as indicated in Fig. 12 in order to form a wedge shaped recess for the grout, or it can have straight sides as shown in Fig. 13, or sides sloping slightly outward.

In Fig. 14 is illustrated a group of tile showing a modified form of the invention. The tile comprises a body or face 28 having an inwardly sloping flange 29 on one side provided with a slot 30. On the opposite side of the tile is a wedge shaped flange 31 formed with an inwardly bent lug 32. Now, when the tiles are assembled in place the lug 32 of one tile will fit into the slot 30 of the other tile and thus firmly hold the tiles together and prevent any movement in a lateral plane. Formed in the other two sides 33 and 34 of the tile are slots 35 and flanges 36, respectively. As shown in Fig. 14, the narrowed portion 37 of the flanges 36 of one tile fits in the slots 35 of the adjacent tile, thus forming an interlocking structure. The narrowed portion 37 of the flanges is as wide as the slots 35 and the shoulder portion of the flanges will form a stop and properly space the row of tiles apart from each other. Numeral 38 designates the slots for the nails 11.

Fig. 18 designates a group of tiles showing another form of the invention in which numeral 39 represents the body or face of the tile and 40 the flanges at each corner thereof. Alongside of each flange is a slot 41. The width of this slot corresponds to the width of the narrowed end 42 of the flange. This narrowed end fits in the slot of the adjacent tile and the shoulder portions and forms a means of properly spacing the tiles apart so as to form a wide recess for the grout. Numeral 43 designates the nail slot in each of the flanges for nailing the tile to a wall. The sides of the tile can be straight, as indicated in Fig. 19, or can slope inwardly, as shown in Fig. 20.

Fig. 21 illustrates a still further modification of the invention in which numeral 44 designates the body of the tile, 45 an upstanding flange at one end and 46 a downwardly extending flange at the opposite end. As shown in Fig. 24, the flanges of one tile are adapted to interlock with the flanges of the adjacent tile. Numeral 47 designates the flanges at opposite ends of the tile provided with nail slots 48 for nailing the tile to the wall. Adjacent to each of the flanges are slots or undercut portions 49 so that the flange of one tile can enter the slot of the adjoining tile.

The tile shown in Fig. 25 is the same as that shown in Fig. 21 with the exception that the two flanges 50 and 51 are used on one side and a single flange 52 is used on the opposite side. Fig. 27 illustrates the manner in which the tiles are assembled and fastened together on the wall. As indicated in dotted lines, the flange of one tile fits underneath the face of the adjoining tile. This type of tile is preferably used for a hair line grout.

The tile shown in Figs. 29 and 30 is substantially the same as that shown in Fig. 18, with the exception that the flanges 53 are somewhat wider and that the four sides 54 are provided with an inward curve and form a wedge means to securely retain the grout in place.

It will thus be seen that we have provided a metal tile which simulates and answers the purpose of the standard ceramic tile yet is more economical. The entire tile is preferably coated with a vitreous enamel which may be made to correspond in color and surface texture with the ordinary vitreous tile. The tile can be applied directly to the wall or can be attached on a wood backing of convenient size and then attached to the wall as a whole unit.

It should be understood that although the invention has been described with particular reference to a rectangular shaped tile, it is not limited thereto since the principles of the invention are equally applicable to a tile having any number of sides, such as a five-sided, six-sided, or eight-sided tile.

What is claimed is:

1. In a tile of the class described, a flat rectangular body member having downwardly extending sides, said sides sloping inwardly towards the bottom, flanges extending from said sides and provided with nail slots, the lengths of said flanges being substantially one-half the length of said sides, the portions of said sides adjacent said flanges being provided with an undercut slot so that the flange of the adjoining tile can fit therein.

2. A series of like symmetrical tiles of the kind described, each consisting of a flat body portion having a peripheral flange extending downwardly from each side of the body and inclined from a plane perpendicular to the body to provide a cement receiving groove in conjunction with another like tile, said flange having outwardly extending foot flange portions at the lower edge of the first flange, said first flange being provided with notches in its lower edge to receive the foot flanges of adjacent tiles, the inclination of the first flange being such as to provide cement receiving grooves upon assembling several tiles with their peripheral flanges in contact.

3. A series of like symmetrical tiles of the kind described, each consisting of a flat body portion having a peripheral flange extending downwardly from each side of the body and inclined from a plane perpendicular to the body to provide a cement receiving groove in conjunction with another like tile, said flange having outwardly extending foot flange portions at the lower edge of the first flange, said first flange being provided with notches in its lower edge to receive the foot flanges of adjacent tiles, the inclination of the first flange being such as to provide cement receiving grooves upon assembling several tiles with their peripheral flanges in contact, said foot flanges being provided with slots for the passage of securing nails.

4. A series of like metal tiles each consisting of a flat body portion having a peripheral flange extending downwardly from the body and provided on its lower edge with alternately disposed notches and outwardly extending flanges so arranged that a last mentioned flange of one tile will fit a notch of an adjacent tile, said last mentioned flanges having their corners cut away to provide reduced outer edges on the same, the first flange being inclined to form a cement receiving groove in conjunction with an adjacent tile.

5. A series of like symmetrical tiles of the kind described, each consisting of a flat body portion having a peripheral flange extending downwardly from each side of the body and inclined outwardly from a plane perpendicular to the body to provide a cement receiving groove in conjunction with another like tile, said flange having at the lower edge outwardly extending foot flange portions, said downwardly extending flange being provided with notches in its lower edge, there being at least one on each side of said body, to receive the foot flanges of adjacent tiles, the inclination of the said downwardly extending flange being such as to provide cement receiving grooves upon assembling several tiles with their peripheral flanges in contact.

6. In a tile of the class described, a flat rectangular body member having downwardly extending sides inclined from a plane perpendicular to the body member, a flange extending from each of said sides and provided with at least one nail slot, the lengths of each of said flanges being substantially one-half the lengths of said sides, the portions of said sides adjacent said flanges being provided with an undercut slot so that the flange of the adjoining tile can fit therein.

7. In a tile of the class described, a flat rectangular body member having downwardly extending sides inclined outwardly from a plane perpendicular to the body member, a flange extending from each of said sides and provided with at least one nail slot, the lengths of each of said flanges being substantially one-half the lengths of said sides, the portions of said sides adjacent said flanges being provided with an undercut slot so that the flange of the adjoining tile can fit therein.

8. A series of tiles of the class described comprising a first tile having a flat rectangular body member having downwardly extending sides inclined from a plane perpendicular to the body member, a flange extending from each of said sides and being provided with at least one nail slot, the length of each of said flanges being substantially one-half the length of said sides, the portions of said sides adjacent said flanges being provided with an undercut slot so that the flange of the adjoining tile can fit therein, a second tile of identical construction as said first tile arranged adjacent to and in the same straight line with said first tile, and a third tile of similar construction as said first and second tiles but having the relative positions of said flanges and undercut slots reversed, said third tile being arranged below and adjacent said first and second tiles, whereby said tiles are in staggered relation.

9. In a tile of the class described, a flat multi-sided body member having downwardly extending sides inclined outwardly from a plane perpendicular to the body member, a flange extending from each of said sides and provided with at least one nail slot, the length of each of said flanges being substantially one-half the length of its sides, the portions of said sides adjacent said flanges being provided with an undercut slot so that the flange of the adjoining tile can fit therein.

NATHAN M. FREEMAN.
CLARENCE H. KORB.